United States Patent
Augustynski et al.

[11] 3,902,921
[45] Sept. 2, 1975

[54] ELECTRIC CELLS OF THE LECLANCHÉ TYPE

[75] Inventors: Jan Augustynski, Geneva, Switzerland; Francis Dalard; Jean-Yves Machat, La Tronche, France; Jean-Claude Sohm, La Tronche, France

[73] Assignee: Anvar, Courbevoie (Haute-de-Seine), France

[22] Filed: Aug. 27, 1973

[21] Appl. No.: 392,090

Related U.S. Application Data

[63] Continuation of Ser. No. 204,006, Dec. 2, 1971, abandoned.

[52] U.S. Cl. .................... 136/102; 136/155
[51] Int. Cl. .......................... H01m 17/00
[58] Field of Search ........... 136/102, 107, 154, 155, 136/136–139

[56] References Cited
UNITED STATES PATENTS

| | | | |
|---|---|---|---|
| 1,864,652 | 6/1932 | Heise | 136/154 |
| 2,571,616 | 10/1951 | Ruben | 136/107 X |
| 2,848,525 | 8/1958 | Schumacher et al. | 136/102 |
| 3,303,054 | 2/1967 | Gruber et al. | 136/107 |
| 3,428,494 | 2/1969 | Watanabe et al. | 136/102 |
| 3,450,569 | 6/1969 | Dumas et al. | 136/155 X |

Primary Examiner—John H. Mack
Assistant Examiner—C. F. Lefevour
Attorney, Agent, or Firm—Dowell and Dowell

[57] ABSTRACT

An electric cell of the Leclanché type, i.e. comprising a solid depolarizing agent such as manganese dioxide or mercury oxide, includes the combination of a zinc anode and of an electrolyte having a base of magnesium perchlorate. The depolarizing agent is conveniently pre-treated by heat in the presence of the electrolyte. Furthermore the separator paper inserted between the "bobbin", i.e. the cathode and depolarizer unit, and the cylindrical can-shaped zinc anode is merely impregnated with the electrolyte without any organic gel liable to generate hydrolyzed products which in turn evolve $CO_2$ when oxydized by the depolarizer, and without any mercury salt to amalgam the zinc anode, such amalgamation being unnecessary with magnesium perchlorate. Owing to the absence of any gas evolution, the cell may be sealed perfectly gastight.

4 Claims, 1 Drawing Figure

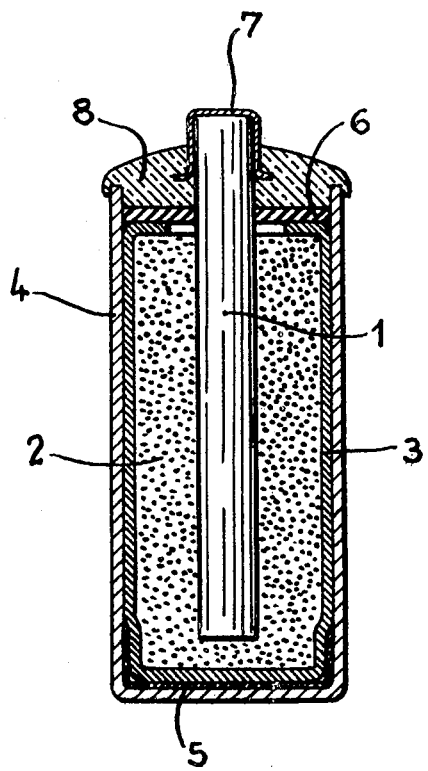

ELECTRIC CELLS OF THE LECLANCHE TYPE

This is a continuation of application Ser. No. 204,006, filed Dec. 2, 1971, now abandoned.

This invention relates to electric cells of the Leclanché type, having a solid depolarizing agent, and it more particularly concerns those known as "dry" cells.

The conventional Leclanche cell comprises an uncorrodible cathode, practically made of agglomerated carbon or graphite, surrounded by a depolarizing mass of manganese dioxide. This cylindrical unit, generally termed "bobbin", is associated with the combination of a can-shaped zinc anode and of an electrolyte having a base of ammonium chloride. The bobbin is lined with a separator formed of a paper layer coated with an appropriate gel impregnated with the electrolyte and with a small percentage of mercury chloride adapted to form an amalgam with the zinc in ordre to reduce the corrosion thereof when the cell is unconnected.

The Leclanché cell has the disadvantage of evolving gases which mainly result from oxidation by the manganese dioxide of the hydrolized products formed by the gel. This reduces the available quantity of the depolarizing agent and decreases the storageability of the cell. Moreover the cell cannot be sealed in a perfectly gas-tight manner and in practice the carbon rod is porous, its protruding upper end being exposed above the annular plug which closes the zinc can. Furthermore the cell "breathes", which causes the formation of carbonates and entails a progressive drying of the bobbin.

A number of modifications have been proposed to the conventional Leclanché cell. The most important consists in replacing manganese dioxide $MnO_2$ by mercury oxide $HgO$, which has led to the realization of special cells for electrical precision apparatus, for electronic watches, etc... It has also been proposed to use magnesium chloride $MgCl_2$ either as an addition to the conventional ammonium chloride electrolyte, or as a substitute thereof. Magnesia has also been added either to the electrolyte or into the bobbin.

Magnesium has been used for the anode in lieu of zinc, but the cells thus obtained evolve noticeable quantities of hydrogen and they show a relatively long delay time when they are connected to an external load after a substantial period of storage.

It is an object of the present invention to improve the operative and storage characteristics of cells of the Leclanche type while avoiding most of their disadvantages.

According to the present invention in a cell comprising a unit formed of an uncorrodible cathode, as for instance made of carbon, surrounded by a solid depolarizing agent such as $MnO_2$ or $HgO$, the said unit is associated with the combination of a zinc anode with an electrolyte having a base of magnesium perchlorate $Mg(ClO_4)_2$. The concentration of $Mg(ClO_4)_2$ in the electrolyte may vary between 1 to 3 moles/litre, preferably between 1,5 to 2 moles/litre.

The depolarizing agent is preferably pre-treated by heat in the presence of the electrolyte. This pre-treatment may be effected before the mounting of the cell or it may be carried on the cell itself before the final sealing thereof. When the depolarizing agent is manganese dioxide, in the first case the pre-treatment is carried at about 80°C during 36 hours, while in the second case the cell is heated at about 60°C for about 4 hours.

As to the separating paper, it is conveniently of absorbent character, its absorbing power for the electrolyte being of about 0.04 $cm^3$ for each $cm^2$ of its area. This paper is merely impregnated with the electrolyte, without any gel or mercury salt.

The accompanying drawing illustrates in axial section a cell according to the invention.

Referring to the drawing the cell comprises a cathode 1 made of an agglomerated carbon or graphite rod, this cathode being surrounded by a cylindrical mass 2 of manganese dioxide to which fine pulverulent carbon (carbon black) and hydrated magnesia have been added. The cylindrical unit or bobbin thus realized is lined with a porous separating paper 3 and it is impregnated with an electrolyte formed of an aqueous solution of magnesium perchlorate saturated with hydrated magnesia. The lined and impregnated bobbin is enclosed in a cylindrical can-shaped zinc anode 4, a paper washer 5 being interposed between the lower end of the bobbin and the bottom of anode 4. An annular covering washer 6 is disposed on the upper end of the depolarizing mass 2 and the protruding upper end of rod 1 is provided with a metallic socket 7. The cell is sealed in a perfectly gas-tight manner by a plug 8 made of a molten waxlike material in which the lower end of socket 7 is embedded.

The cell according to the invention affords a number of important advantages. The absence of any gel prevents the formation of hydrolyse products and therefore the evolution of $CO_2$ resulting from oxidation of these products by the depolarizing agent. The pre-treatment of this agent helps to the elimination of any gas generation within the cell. The latter may thus be sealed in a perfect gas-tight manner and it does not "breathe", which fully avoids any evaporation of its electrolyte. The operation at low temperatures is improved. The possible storage time is increased. Owing to the suppression of any amalgamating process, the manufacturing operations are simplified and their cost is reduced. Furthermore in the case of a depolarizing agent formed of mercury oxide $HgO$, the perfect gas-tight character of the cell prevents the formation of outer carbonate deposits, which is a considerable advantage in many applications, as for instance in the case of electronic watches.

We claim:

1. A primary electric cell which can be fully sealed because of negligible quantity of gas evolved, comprising:
   a. a solid anode consisting essentially of zinc;
   b. an uncorrodable cathode;
   c. a paper separator in direct contact with the zinc anode;
   d. a solid depolarizing agent operatively associated with said cathode;
   e. an electrolyte interposed between the cathode and the paper separator and in direct contact with the paper, the electrolyte consisting essentially of an aqueous solution of magnesium perchlorate saturated with magnesium hydroxide to minimize the corrosive effect on the anode of the electrolyte; and
   f. means for sealing the cell gas-tight.

2. The cell as set forth in claim 1, wherein the concentration of magnesium perchlorate in said electrolyte is in the range of 1 to 3 mole/litre.

3. The cell as set forth in claim 1, wherein the concentration of magnesium perchlorate in said electrolyte is in the range of 1.5 to 2 mole/litre.

4. The cell as set forth in claim 1, wherein said zinc anode is in the form of a cylindrical can surrounding said paper separator and enclosing said depolarizing agent and said cathode, said can being closed at one end, and said cathode comprising a carbon rod extending from the other end of the can, and said sealing means including a terminal covering the end of the rod and including means for sealing the terminal to the can.

* * * * *